(12) United States Patent
Garrote et al.

(10) Patent No.: US 11,947,976 B2
(45) Date of Patent: Apr. 2, 2024

(54) SYSTEM AND METHOD FOR SEMANTIC METADATA EXTENSIONS IN API GOVERNANCE USING VALIDATION RULESETS

(71) Applicant: Salesforce, Inc., San Francisco, CA (US)

(72) Inventors: Antonio Garrote, San Francisco, CA (US); Pedro Colunga, San Francisco, CA (US); Jonathan Stoikovitch, San Francisco, CA (US); Martin Gutierrez, Pilar, AZ (US); Lucas Block, Pilar, AZ (US); Lucas Luppani, Pilar, AZ (US)

(73) Assignee: Salesforce, Inc., San Francisco, CA (US)

( * ) Notice: Subject to any disclaimer, the term of this patent is extended or adjusted under 35 U.S.C. 154(b) by 9 days.

(21) Appl. No.: 17/948,831

(22) Filed: Sep. 20, 2022

(65) Prior Publication Data

US 2023/0085956 A1 Mar. 23, 2023

Related U.S. Application Data

(60) Provisional application No. 63/246,098, filed on Sep. 20, 2021.

(51) Int. Cl.
*G06F 9/445* (2018.01)
*G06F 8/41* (2018.01)
(Continued)

(52) U.S. Cl.
CPC .......... *G06F 9/44526* (2013.01); *G06F 8/427* (2013.01); *G06F 9/541* (2013.01);
(Continued)

(58) Field of Classification Search
CPC ...... G06F 9/44526; G06F 9/541; G06F 9/547; G06F 16/2365; G06F 16/252;
(Continued)

(56) References Cited

U.S. PATENT DOCUMENTS 10,983,963 B1 * 4/2021 Venkatasubramanian ................... G06F 16/1824
2004/0268305 A1 * 12/2004 Hogg ........................ G06F 8/20
717/109

(Continued)

*Primary Examiner* — Wing F Chan
*Assistant Examiner* — Leon Y Tseng
(74) *Attorney, Agent, or Firm* — Sterne, Kessler, Goldstein & Fox P.L.L.C.

(57) ABSTRACT

Disclosed herein are system, method, and computer program product embodiments for incorporating metadata extensions of various metadata formats into a metadata mapping or graphing function. Extensions for various formats are separately defined with a predetermined syntax. When a metadata object is received, it is scanned to determine whether any extensions are present. When such an extension is detected, the parser is loaded with an extension parsing plugin corresponding to the format of the metadata object. That plugin retrieves extension definitions from a repository in order to accurately parse the extension information of the metadata object. The metadata object and its extensions can then be parsed and graphed accordingly.

20 Claims, 8 Drawing Sheets

(51) Int. Cl.
   *G06F 9/54* (2006.01)
   *G06F 11/36* (2006.01)
   *G06F 16/23* (2019.01)
   *G06F 16/25* (2019.01)

(52) U.S. Cl.
   CPC .......... *G06F 9/547* (2013.01); *G06F 11/3608* (2013.01); *G06F 11/3692* (2013.01); *G06F 16/2365* (2019.01); *G06F 16/252* (2019.01)

(58) Field of Classification Search
   CPC .. G06F 8/427; G06F 11/3608; G06F 11/3692; G06F 8/42–43; G06F 11/3604
   USPC ........................................ 709/229; 717/143
   See application file for complete search history.

(56) References Cited

U.S. PATENT DOCUMENTS

| | | | | |
|---|---|---|---|---|
| 2017/0177882 A1* | 6/2017 | Allgaier | .................... | G06F 8/10 |
| 2017/0286456 A1* | 10/2017 | Wenzel | .................. | G16H 10/20 |
| 2022/0101153 A1* | 3/2022 | Hubauer | ................ | G06N 20/00 |

* cited by examiner

US 11,947,976 B2

SYSTEM AND METHOD FOR SEMANTIC METADATA EXTENSIONS IN API GOVERNANCE USING VALIDATION RULESETS

CROSS-REFERENCE TO RELATED APPLICATIONS

This application claims the benefit of U.S. Provisional Patent Application No. 63/246,098, filed Sep. 20, 2022, entitled "API Governance Using Validation Rulesets," which is incorporated by reference herein in its entirety.

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

An endpoint of an API is an access point (e.g., a URL) through which a user can interact with the API (e.g., input and output flows). An API can include one or more endpoints. It is of interest for API developers to make sure APIs behave reliably so as to provide users reliable interaction with the API.

Existing tools are often syntax specific and may require a different set of validation rules for different types of endpoints. This can be time consuming and tedious for complex APIs. Additionally, existing tools are unable to account for semantic extensions of a particular format. Accordingly, what is needed are tools for validating REST APIs having semantic extensions.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
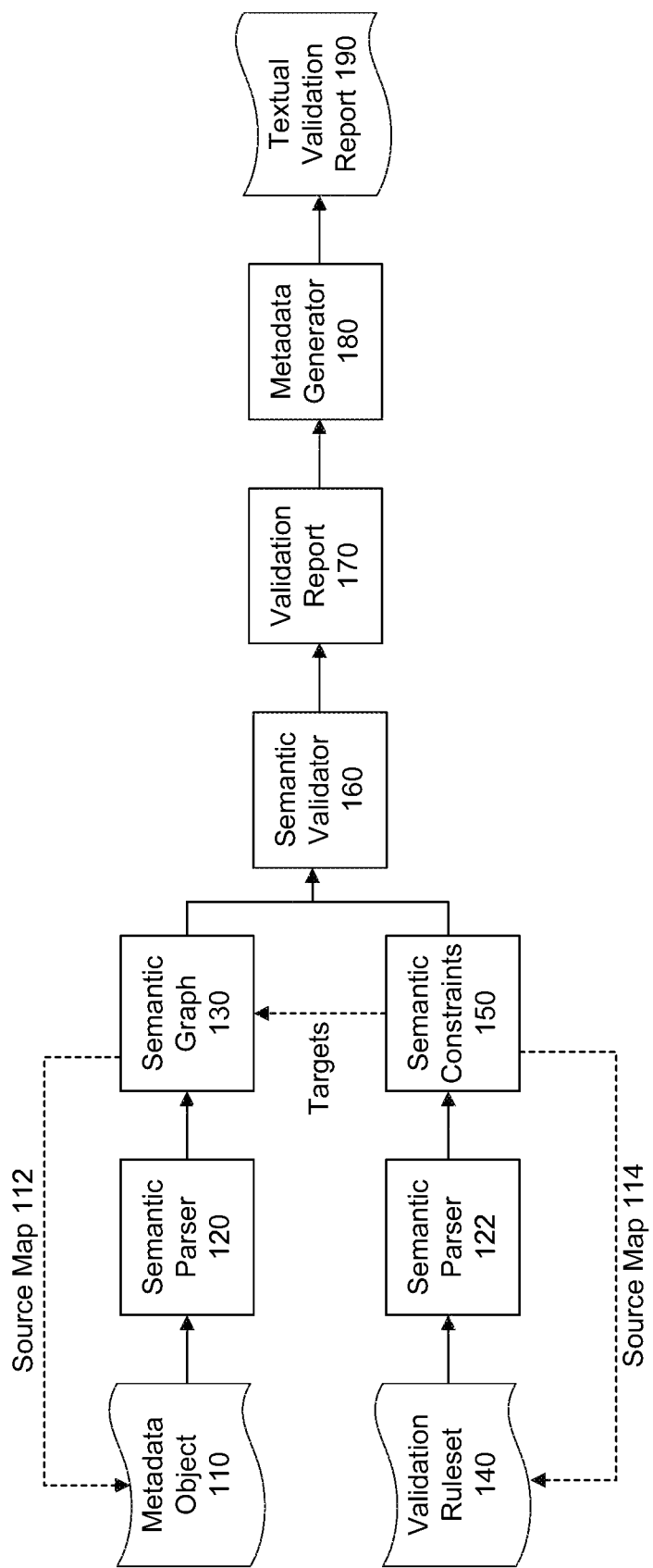
FIG. 1 is a block diagram of a system for semantic metadata validation, in accordance with an embodiment.

Provided herein are system, apparatus, device, method and/or computer program product embodiments, and/or combinations and sub-combinations thereof, for syntax independent validation of metadata.

Within an information technology (IT) system, there may be multiple resources that may generate metadata or from which metadata objects may be generated. A metadata object may describe a resource or specific aspects/functions of a resource and may be stored as structured data in a file system or database. As a non-limiting example, an IT system hosting a REST API may generate metadata describing endpoints of the REST API. In some embodiments, multiple metadata objects describing the same endpoints may be generated. These metadata objects may be of different metadata formats. A metadata format may be a formal mechanism, with a well-defined syntax and grammar, of capturing information consumed or produced by an IT system. Examples of metadata formats may include API specifications (e.g., OAS 3.0, RAML, GraphQL, etc.), configuration files (e.g., Docker files), API policies descriptors (e.g., Kubernetes, Istio CRDs, etc.).

In some embodiments, resources and processes of an IT system may be validated by applying validation rules to the metadata objects describing the resources. This type of validation provides a method for checking that the resource contains all the expected elements and behaves in expected manner. For example, validation of an API may include verifying that each endpoint returns the expected data type, verifying that endpoints containing sensitive information are secure and require authentication to access, etc. This may be accomplished by writing and applying validation rules that enforce the relevant constraints over the metadata object describing the resource.

Validation rules may be declarative functions expressing constraints to be enforced over metadata. A validation rule may comprise three main components. These components may be documentation describing the goal of the rule and the validation error message that will be displayed if the rule fails, a rule target describing a specific part of the metadata to which the validation rule will be applied, and a rule definition. A rule definition may be a declarative expression declaring the constraint that will be checked over the target.

In order to perform resource validation in this way, validation rules need to be written such that they match the metadata format. This can become time-consuming and prone to error when the metadata objects describing the resources are of different metadata formats. This is because different validation rules need to be written for each metadata format even when the metadata objects describe resources that must conform to the same constraints. As such, it would be beneficial to parse the metadata objects into a unified format for which validation rules can be written. This will allow for a syntax independent mechanism to validate heterogeneous metadata generated across a variety of different IT processes.

In embodiments, developers may wish to extend different formats to include additional information. For example, a standard format may provide the ability to describe most key information that could be germane to the developer. But no standard format is designed to document all relevant data. Thus, situations may arise where a developer wishes for a particular format to support additional information. This can be achieved by "extending" the format—altering the standard format in a desired way to support the additional information desired. Although each standard format typically includes a standard extension mechanism, these mechanisms differ between the different standards. As a result, metadata extensions do not easily lend themselves to heterogeneous metadata generation. To address this, embodiments of the present disclosure include parsers for each of the different metadata extensions formats to parse the format-specific metadata, which is then mapped to the common model with common semantics.

In embodiments, the common model is a semantic graph model A semantic graph model is a data format where information is stored as linked nodes holding properties where every node of data has a valid global identifier, and every node, link and property has a well-defined meaning through a set of globally valid labels attached to them. The labeled graph resulting from this definition can be used as input for a formal reasoning engine, which transforms the graph into an equivalent set of logical assertions. RDF, which is a W3C semantic web standard, is an example of a semantic graph.

In embodiments, the metadata format extensions have associated metadata format extension syntaxes. These syntaxes are concrete and defined in the metadata format to extend the kind of information that can be encoded in the format with different semantics than the ones envisioned by the author of the format. Examples include OAS vendor extensions, RAML annotations, JSON Schema dialects, GraphQL directices or ProtoBuffer custom options. For the standard syntax of the metadata format, semantics can be associated describing the meaning of the information generated when parsing the format. However, for an extension, the semantics cannot be determined beforehand, since they depend on the private usage of that information by the creator of the extension that is different from the designer of the metadata format. As such, there is a need for a way to parse metadata objects that include format extensions into the common model for graphing purposes.

In some embodiments, the metadata objects (together with the metadata extensions) may be parsed into a sematic graph data model where the semantic labels of the graph identify information within a particular business domain ontology. Semantic parsers may be used to parse input metadata into a semantic graph and generate global identifiers for each node in the generated semantic graph so related information referenced in different semantic graphs can be linked together into a connected semantic graph that can then be validated. Once input metadata has been parsed and a unified semantic graph has been generated, validation rules may be applied over the sematic graph instead of individual metadata objects. This allows users to define validation rules in a unified and simplified way by targeting a semantic model as opposed to specific syntaxes of different disconnected metadata formats.

In some embodiments, validation may be performed by a semantic validator. The sematic validator may accept a validation ruleset and one or more semantic graphs as inputs and generate a validation report indicating any violations of the rules in the ruleset over the input semantic graphs.

The semantic validation process may comprise three stages: semantic graph linking, semantic inference, and semantic constraint check. In the semantic graph linking stage, multiple input semantic graphs may be combined into a single, unified semantic graph by merging nodes with the same global identifier. For example, a first input graph may have been generated from a first metadata object containing general information about an API endpoint. A second input graph may have been generated from a second metadata object containing authentication information about the same endpoint. Because both input graphs describe the same endpoint, they will both have a node with a global identifier identifying the endpoint. This global identifier may be used by the semantic validator to link the nodes containing the global identifier in first and second input graph. After linking both graphs are combined into a single unified semantic graph with a node for the endpoint containing the general information from the first graph and the authentication information from the second graph.

In the semantic inference stage, the unified graph may be enriched by the application of a set of logical rules that add new labels into semantic graph nodes, properties, and links. This allows for the possibility to unify the potential semantic differences carried from the underlying metadata formats or to map related concepts to a common ontology. Multiple logical formalisms can be used to define the rules enriching the semantic graph consumed as a set of logical assertions such as rules, ontologies and query languages.

In the semantic constraint check stage, sematic validation may be performed over the unified and enriched semantic graph. Semantic validation is the process of checking a set of semantic constraints that are contained in a ruleset over the instance of a semantic graph and reporting non-conformant nodes in the graph for each of the semantic constraints being validation. The source of the validation is reported to the original metadata format due to the associated source maps. This process is further described in FIG. 1.

FIG. 1 is a block diagram of a system for semantic metadata validation, in accordance with an embodiment. A metadata object 110 may be fed into a semantic parser 120 as an input and semantic parser 120 may then parse metadata object 110 to produce a semantic graph 130. In an embodiment, the metadata object 110 includes metadata extensions customized by the user. Semantic graph 130 may be a data model in which information is stored in linked nodes comprising properties. As part of the parsing process, semantic parser 120 may generate a source map 112. Source map 112 may contain information relating each node, link, and property of semantic graph 130 to the specific syntactical location (line, column) in the source metadata object from which the information was parsed. Additionally, source map 112 may be stored in semantic graph 130. To achieve this, the semantic parser 120 must be capable of parsing the metadata extensions, as will be described in further detail below.

In some embodiments, multiple metadata objects 110, of one or more metadata formats, describing a resource may be fed into semantic parser 120. The metadata objects 110 describing the resource may have been generated by different processes within an IT system hosting the resource, and may include different metadata extensions defined by the user. Semantic parser 120, configured to parse metadata objects of the one or more metadata formats and their respective extensions, may parse these metadata objects and generate a single semantic graph 130 describing the resource. In this case, multiple source maps 112, one for each input metadata object, may be generated during the parsing process.

Validation ruleset 140 may comprise a set of validation rules to be applied to input metadata object 110 during the semantic validation process. In some embodiments, validation ruleset 140 may be stored in a metadata format. A second semantic parser 122 may be configured to accept validation ruleset 140 as an input and parse the ruleset into a set of semantic constraints 150, which semantic parser 122 may provide as an output. Semantic constraints 150 may comprise a set of sematic constraints as defined by validation rules in validation ruleset 140 and map to semantic graph 130. Additionally, semantic parser 122 may also generate source map 114 as part of the semantic parsing process of validation ruleset 140.

Once the parsing process has been completed, the outputs, semantic graph 130 and semantic constraints 150 are then fed into semantic validator 160 as inputs. Semantic validator 160 may accept one or more semantic graphs 130 and semantic constraints 150 parsed from a validation ruleset 140 as inputs and output a validation report 170.

In some embodiments, semantic validator 160 may translate semantic constraints 150 into a first-order logic (FOL) representation of the rules. Alternatively, if a validation library that requires a specific validation rule language is used, sematic validator 160 may translate semantic constraints 150 to the required language. For example, a general-purpose policy engine such as Open Policy Agent (OPA) may be used to perform the validation of semantic graph 130. Accordingly, semantic validator 160 may translate the validation rules to OPA's policy language, Rego.

The product of this translation may be structural checks that can be applied over sematic graph 130. The structural checks may be defined in terms of the semantic labels associated with the nodes, properties, and links of the semantic graph which server as rule targets. In some embodiments, individual structural checks may be combined using Boolean operators to produce more complex validations.

Validation report 170 may comprise violations of the validation rules from validation ruleset 140 when applied to semantic graph 130. However, validation report 170 may not contain contextual information about each violation that would be useful in addressing the violations. As such, validation report 170 may be converted into textual validation report 190, which can be consumed by a human user or processed by a machine, using metadata generator 180. In order to generate textual validation report 190, metadata generator 180 may retrieve, for each violation, a set of information relevant to the violation and provide the information in a human readable format. In some embodiments, the information provided for each violation may include the severity of the violation, the validation error message, the identifier of the rule, the unique global identifier of the node in the semantic graph, and syntax information of the location of the failing node in the source metadata object. In some embodiments, an execution trace containing the evaluation steps followed by the validator to check the failed semantic constraint over the input semantic graph may also be provided for one or more of the violations in textual validation report 190 for debugging purposes.

In some embodiments, textual validation report 190 may be sent to a client device application and displayed to a user via a user interface (UI). The application may be a web, desktop, or mobile application. Additionally, or alternatively, textual validation report 190 may be processed by a backend application to determine whether any of the violations meet a predetermined severity threshold. If a violation of a severity level meeting or exceeding the threshold is found, a notification may be generated and pushed to one or more designated users.

Figure 2:
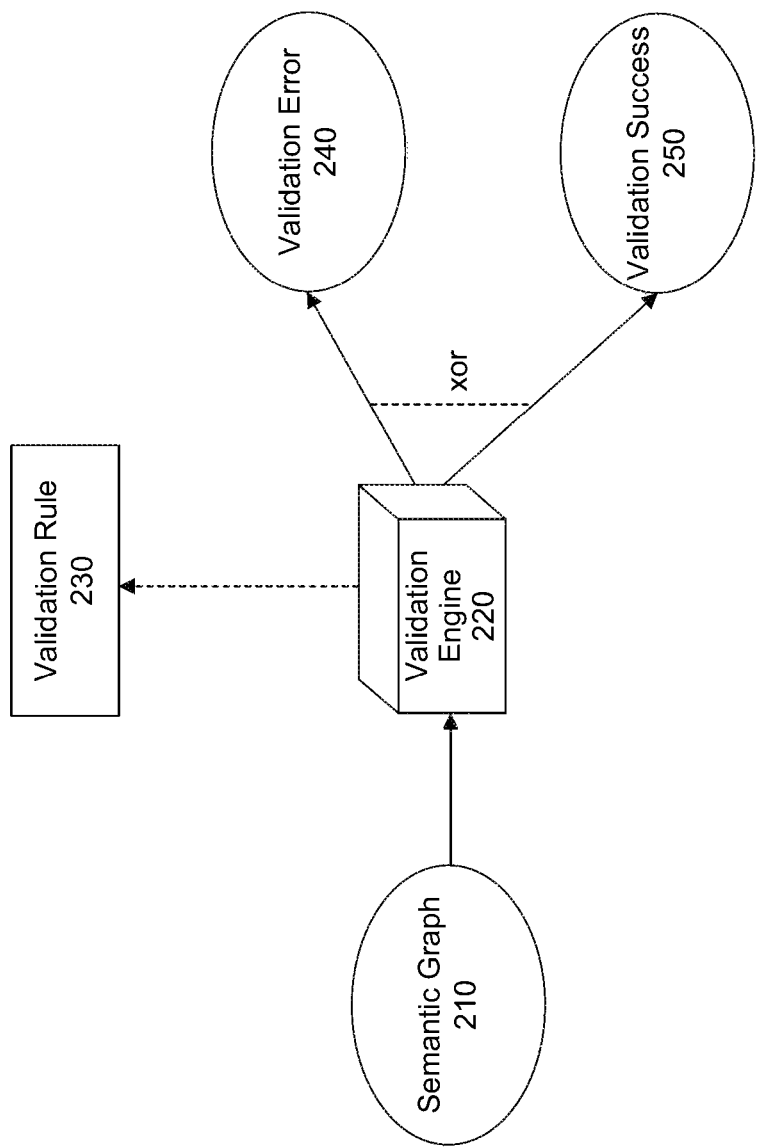
FIG. 2 is a block diagram illustrating a system for semantic metadata validation using basic validation, in accordance with an embodiment.

FIG. 2 is a block diagram illustrating a system for semantic metadata validation using basic validation, in accordance with an embodiment. Validation rules 230 are the basic validation unit and express a single constraint that can be enforced over semantic graph 130 in terms of the semantic labels. These semantic labels are labels associated with the nodes, links and properties of semantic graph 130 and encoded in semantic graph 130 as part of the semantic parsing process. Validation rules 230 may further be characterized as a function that uses sematic graph 130 as an input and generates a validation result as an outcome. However, validation rules 230 are written in declarative syntax and thus a validation engine 220 may be required to interpret the declared rules into logical assertions and compute the final validation results (either an error 240 or success 250). It should also be noted that two or more validation rules 230 may be combined to form more complex validation rules and thus increasing the expressivity and power of the validation mechanism.

As noted above, each validation rule 230 may comprise three main components: documentation, rule target, and rule definition. The documentation may be human-readable description documenting the goal of the rule and the validation error message that will be displayed if the rule fails. The rule target may be a selector for a set of target nodes in the input semantic graph 130 which will be checked to determine whether they conform to the validation rule. Target nodes may be defined in validation rules 230 as the labels of the nodes being targeted by each rule. These nodes may be selected in sematic graph 130 by matching the target selector over the node with the node label in sematic graph 130. The rule definition may be a declarative expression declaring the constraint that will be checked over the target nodes.

In some embodiments, there may be two types of validations that can be performed by the mechanism described herein: basic validation and complex validation. Validation rules 230 may be basic validation rules. Basic validation may use basic validation rules 230 to constrain properties of any node in the input semantic graph 130, according to the well-defined set of validation rules 230. The application of basic validation rules 230 may compute first a set of values over which the rule will be checked. In some embodiments, in order to select the values over which the rule will be checked, the designer of a basic validation rule 230 may use the name of a property in the node or a complex property path from the target node. Property paths may include sequential properties, alternative paths, or inverse paths. As noted above, validation engine 220 is responsible for interpreting basic validation rules 230 and applying the validation rules over the selected values.

Examples of basic validation rules 230 may include rules that check the cardinality of properties, rules that check regular expressions over the property values, rules that enumerate the potential values for a property, etc. In some embodiments, basic validation rules 230 may quantify the validation check numerically and introduce the constraint checking that matching values can differ to each other. In some embodiments, basic validation rules 230 may be used to compare values of more than one property in a target node with each other.

Violation of validation rules 230 may result in a validation error 240. Validation engine 220 may perform the checks and determine a violation of one or more of the validation rules 230 has occurred. Accordingly, validation engine 220 may output a validation error 240. Validation error 240 may comprise the identifier of the rule being violated, the value or values causing the validation error 240, and the error message provided in the documentation of the rule. Alternatively, if no violations of validation rules 230 are detected, validation engine 220 may output validation success 250 indicating that semantic graph 130 is conformant (e.g., the resource described by semantic graph 130 is compliant with the constraints checked by validation rules 230).

Complex validation may use complex validation rules to applying more expressive constraints over the input semantic graph 130. Complex validation rules may be generated by combining basic validation rules 230 using logical operators (e.g., and, or, xor, and not). Complex validation rules may be applied to semantic graph 130 by validation engine 220 in a similar manner to basic validation rules 230 as described above.

In some situations, complex validations may not be sufficient to check a particular constraint over an input metadata graph 130. These situations may warrant the use of a third-party validation library such as Open Policy Agent (OPA), which uses Rego, a high-level declarative language, to define validation rules. As such, the validation engine may need to translate rules into the language required by the third-party validation library. As a non-limiting example, Rego will be used to describe this validation process herein. In some embodiments, validation engine 220 may use Action Message Format (AMF) to parse validation rules into compliant Rego code that can then be used by the OPA validation library to apply constraints over semantic graph 130. These Rego validation rules may be characterized as Rego templates designating the next node in semantic graph 130 to be validated. Rego validations may be used as stand-alone validation. Alternatively, Rego validations may be combined with simple and complex validations using regular Boolean combinations.

Metadata formats (e.g., API specs, like OAS or GraphQL, devops descriptors for Kubernetes and Istio, etc.) all provide ways of extending the information that can be provided in the format through some kind of syntactical extension mechanism (vendor extensions in OAS, directives in GraphQL, etc.). Each of these mechanisms is specific to one format and have different syntaxes. In order to allow metadata authors to define the same information in multiple formats, different syntactical extensions must be defined for each of the formats, the information parsed by different custom parsing layers and mapped to a common model with common semantics.

In order to define the semantic extension, a formal way of describing the extension schema and associated semantics is required. Multiple formalisms can be used, but they all must describe an abstract input syntax and provide a mapping to a target output data model. Since the semantic extension mechanism also captures the semantics of the information as a set of label mapping information to terms in a formal ontology, a semantic graph is the required target data model.

To illustrate this functionality, an example is provided below in which a semantic extension to mark information provided in a metadata format as PII privacy sensitive information. In order to accomplish this, semantics for the different data schemas exposed through the metadata format is needed. This requires mapping whole schemas and schema attributes to an ontology of business domain entities and properties, independently of the actual string label used in the schema.

Once the semantics for the data schemas are provided, different parts of those schemas can be classified as personal information through a mapping from properties and entities in the business domain ontology to the different legislation pieces with different criteria about the scope of personal data. Below is an exemplary schema for the business terms as a semantic extension using a formal language (MuleSoft's Anypoint Modeling Language in the example):

```
#%Dialect 1.0
dialect: Business Semantics
version: 1.0.0
uses:
    apiContract: http://a.ml/vocabularies/apiContract
    shapes: http://a.ml/vocabularies/shapes
documents:
    library:
        declares:
            ap-business-term: BusinessTerm
            ap-business-context: Businesscontext
annotationMappings:
    BusinessContext:
        target: apiContract.WebAPI
        propertyTerm: apiContract.businessContext
        range: BusinessVocabulary
        allowMultiple: true
        mapKey: alias
        mapValue: prefix
    BusinessTerm:
        target: shapes.Shape
        propertyTerm: apiContract.businessTerm
        range: link
nodeMappings:
    BusinessVocabulary:
        mapping:
            alias:
                range: string
                mandatory: true
            prefix:
                range: string
                mandatory: true
```

The definition of a semantic extension involves the declaration of at least the following: (1) a "target" that defines a node in the target model that can be annotated; (2) a "propertyTerm", which is a vocabulary property in the target model for the extension; and (3) a "range" that defines the schema for the extension, scalar or object. The rest of the facets are the common property for a property mapping in the host formal language, and they are the regular facets to describe the schema of an abstract syntax tree (AST) mapping each node in the AST to a semantic term and property in a target output semantic graph.

In order to avoid name collisions, in embodiments, a namespace is provided for the extension and the author of the annotation is responsible for providing a name that will be valid in the syntax of the different target specifications. In the above example, the extension definition document introduces two different semantic extensions: "ap-business-term and ap-business-context. ap-business-term may provide a mechanism to annotate a whole schema or an attribute in the schema with a business term coming from some external ontology. This is described in the extensions description document by the target facet, which constrains the annotation to any node in the input API specification AST mappable to a shapes.Shape node in the output graph model (data type in RAML, schema in OAS, type in GraphQL, message in gRPC, etc.).

In the above example, the target term is expressed as a string that point to a URI that globally identifies the business meaning for the schema. Terms can come from any business ontology, for example, schema.org, FIBO or FHIR. In the above example, a Salesforce Cloud Information Model is used as the standard vocabulary to mark business terms, since it includes a business ontology for personal information concepts and PII has already been marked accordingly. The second annotation, ap-business-context, is an optional helper annotation to work with CURIEs instead of full URIs in the semantic annotations. The annotation allows annotator to define a set of URI prefixes to provide a compact way of annotating the schemas, using strings containing compact URIs (CURIEs) like 'cim:Individual' instead of the more verbose 'http://cloudinformationmodel.org/model/Individual," by introducing the prefix 'cim' in the context of the document.

Figure 3:
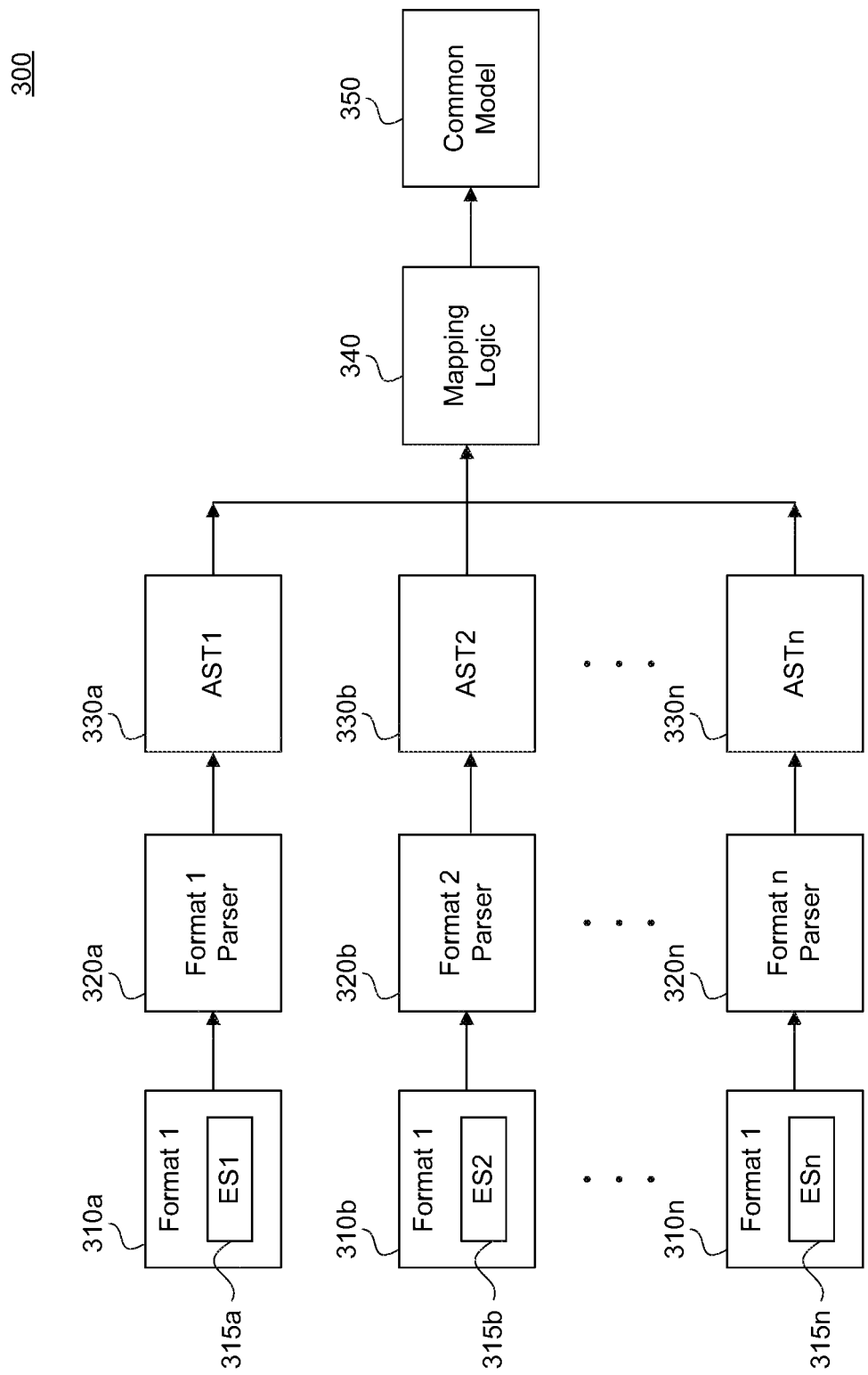
FIG. 3 illustrates of an exemplary modeling system according to embodiments of the present disclosure.

FIG. 3 illustrates a block diagram of an exemplary modeling system 300 according to embodiments of the present disclosure. As shown in FIG. 3, the modeling system 300 includes multiple different mapping paths, corresponding to the different metadata formats available. For example, in a first mapping path, a first format 310a having a first extension syntax 315a is provided to a format 1 parser 320a. The format 1 parser 320a parses the received metadata object to generate an abstract syntax tree (AST 1) 330a.

The other mapping paths function similarly to path 1. For example, in a second mapping path, a second format 310b metadata object includes second extension syntax 315b. The metadata object is provided to a format 2 parser 320b, which parses the metadata object according to the format 2 specification in order to generate AST 2 330b. This can be repeated for any number of mapping paths corresponding to any number of mapping paths, each having its own metadata object 310n in a corresponding format along with corresponding extension syntaxes 315n. Similarly, each mapping path will include a corresponding format parser 320n to generate a correspond AST n 330n.

Using all the ASTs generated by the various mapping paths, mapping logic 340 generates a common model 350 that reformats the various formats into a standard format, such as an output graph. Although not shown, the modeling system 300 may further include a language server capable of understanding the AST of a metadata format and providing editing support functionality based on the schema and semantics defined for that metadata format, like auto-completion, suggestions, and validation.

In the above figure, if the mapping step is missing, then the manually created mapping logic step is also missing, and thus the semantics of the extension cannot be determined, since they are private to the author of the extension and the semantic parsing step can only generate a generic graph of data without capturing the intended meaning of the information. In other words, for an example metadata object that includes a "schema-org:license" extension, instead of properly capturing this field, a generic node is inserted containing information that the API includes an extension generating a field named "license".

In embodiments, the format parsers 320 include semantic parsing modules to integrate with a registry of extensions and provide the parsing logic to automatically direct the parsing logic to match the metadata format extension syntax to the abstract syntax of the extension. In embodiments, this can be achieved with a plugin. Continue with the above example, consider first a metadata object (without extensions) in the OAS 3 specification:

```
openapi: 3.0.0
info:
    title: Orders API
    version: "1.0.0"
servers:
    - url: http://api.mythical.com/order
components:
    schemas:
        User:
            type: object
            properties:
                name:
                    type: string
paths:
    /users:
        get:
            responses:
                "200":
                    description: ""
                    content:
                        application/json:
                            schema:
                                type: array
                                items:
                                    $ref: "#/components/schemas/User"
```

In embodiments, the extended version of this object, including the ap-business-context and ap-business-term fields, would be as follows:

```
openapi: 3.0.0
info:
    title: Orders API
    version: "1.0.0"
servers:
    - url: http://api.mythical.com/order
x-ap-business-context:
    cim: http://cloudinformationmodel.org/model/
components:
    schemas:
        User:
            x-ap-business-term: cim:Individual
            type: object
            properties:
                name:
                    x-ap-business-term: cim:firstName
                    type: string
paths:
    /users:
        get:
            responses:
                "200":
                    description: ""
                    content:
                        application/json:
                            schema:
                                type: array
                                items:
                                    $ref: "#/components/schemas/User"
```

As shown in these examples, the extension is inlined in the right element of the spec *the User schema and the name attribute in the schema). Through these extensions, both schemas are mapped to CIM Individual and firstName entity and property, respectively. A similar modification can be made in the other specifications, such as RAML or GraphQL.

In some embodiments, depending on the format of the metadata object, the AST of the format schema does not directly match the abstract AST defined for the extension, so the plugin must identify the specific syntax to the semantic extension schema through some simply mapping rules. Further, in embodiments, the metadata parsing plugin loads the set of vendor extension definitions in the extension registry and uses the provided extension metadata to parse incoming API specifications generating the additional output metadata as directed by the vendor extension definition. An enriched graph with the correct semantics for the extension information is produced as a result.

In embodiments, before applying the extension, some specification formats like GraphQL and optionally AML require the extension to be declared using the metadata format extension declaration syntax. In these cases, the AML schema must be translated to the target specification language extension declaration mechanism.

Continuing the above example, below is an example of an output semantic graph in which the standard document was parsed without extension support (expressed using standard JSON-LD syntax):

```
{
    "@id": "#/declarations/types/User",
    "@type": [
        "shacl:NodeShape",
        "shapes:Shape"
    ],
    "shacl:closed": false,
    "shacl:name": "User",
    "shacl:property": {
        "@id": "#/declarations/types/User/property/name",
        "@type": [
            "shacl:PropertyShape",
            "shapes:Shape"
        ],
        "shapes:range": {
            "@id": "#/declarations/types/User/property/name/scalar/name",
            "@type": [
                "shapes:ScalarShape",
                "shapes:Shape"
            ],
            "shacl:datatype": {
                "@id": "xsd:string"
            },
            "shacl:name": "name"
        },
        "shacl:minCount": 1,
        "shacl:name": "name",
        "shacl:path": {
            "@id": "data:name"
        }
    }
}
```

Meanwhile, after processing the vendor extension definitions, the parser generates the following output semantic graph according to the semantics defined in the extension:

```
{
    "@id" : "#/declarations/types/User",
    "apiContract.businessTerm": {
        "@id": "http://cloudinformationmodel.org/model/Individual"
    },
    "@type": [
        "shacl:NodeShape",
        "shapes:Shape"
    ],
    "shacl:closed": false,
    "shacl:name": "User",
    "shacl:property": {
        "@id": "#/declarations/types/User/property/name",
        "apiContract.businessTerm": {
            "@id": "http://cloudinformationmodel.org/model/firstName"
        },
        "@type": [
            "shacl:PropertyShape",
            "shapes:Shape"
        ],
        "shapes:range": {
            "@id": "#/declarations/types/User/property/name/scalar/name",
            "@type": [
                "shapes:ScalarShape",
                "shapes:Shape"
            ],
            "shacl:datatype": {
                "@id": "xsd:string"
            },
            "shacl:name": "name"
        },
        "shacl:minCount": 1,
        "shacl:name": "name",
        "shacl:path": {
            "@id": "data:name"
        }
    }
}
```

As shown above, the apiContract.businessTerms properties have been added to the model including the mapping to particular CIM terms as defined through the annotation of the input specification document. Notably, by defining the extensions once in an abstract syntax with well-defined semantics, individual parsing plugins operating within those defined definitions are capable of translating the abstract syntax into the specific syntax of the different metadata formats, and generating a semantic graph with well-defined semantics. This is shown for example, in FIG. 4.

Figure 4:
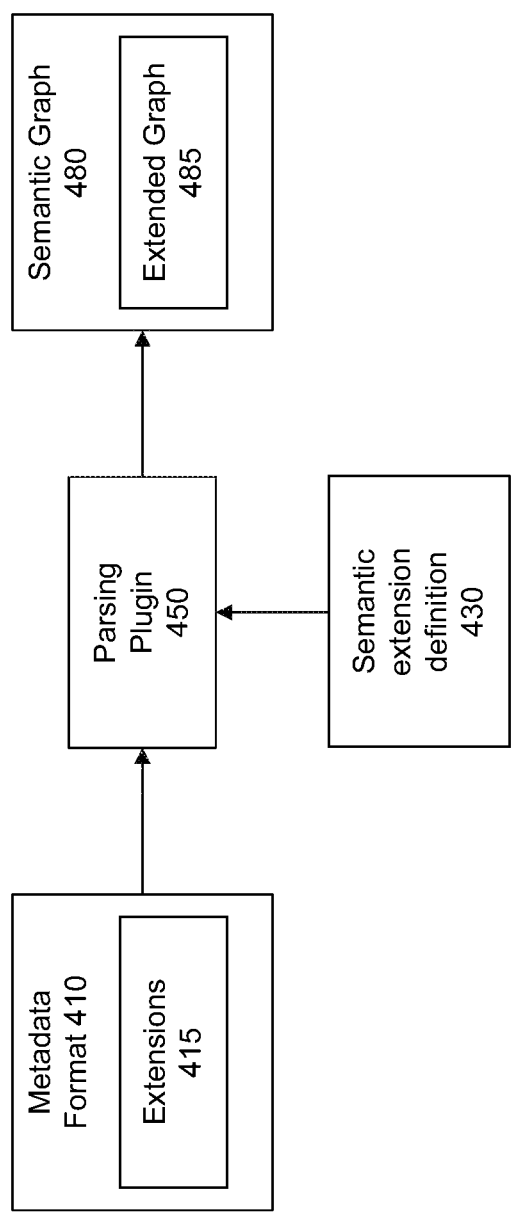
FIG. 4 illustrates a functional block diagram of an exemplary metadata extension parsing system according to embodiments of the present disclosure.

FIG. 4 illustrates a functional block diagram of an exemplary metadata extension parsing system 400 according to embodiments of the present disclosure. As shown in FIG. 4, a metadata format 410 includes extensions 415. This information is provided to a parsing plugin 450. In an embodiment, the parsing plugin 450 is an addition to the standard parsing logic for parsing the metadata format. In different embodiments, the plugin 450 may be preloaded with relevant extension definitions. However, in other embodiments, the plugin 450 must recognize an extension present in the received metadata object, and retrieve the semantic extension definition 430 from a repository.

With the appropriate extension definition, the parsing plugin operates to graph the extensions of the metadata object. In other words, the parsing plugin 450 generates a semantic graph 480 corresponding to the metadata format. When extensions are present in the metadata object, the parsing plugin 450 additionally generates the extended graph 485 using the semantic extension definition. In embodiments, the parsing operation includes a process of mapping an input metadata format into a semantic graph assigning the process well-defined semantics to the metadata format by attaching semantic labels to the generated nodes, properties and links, and by minting globally valid identifiers to identify the new information provided. This results in a fully representative graph of the metadata object that includes both the base syntax of the metadata format as well as a representation of the metadata extensions.

Figure 5:
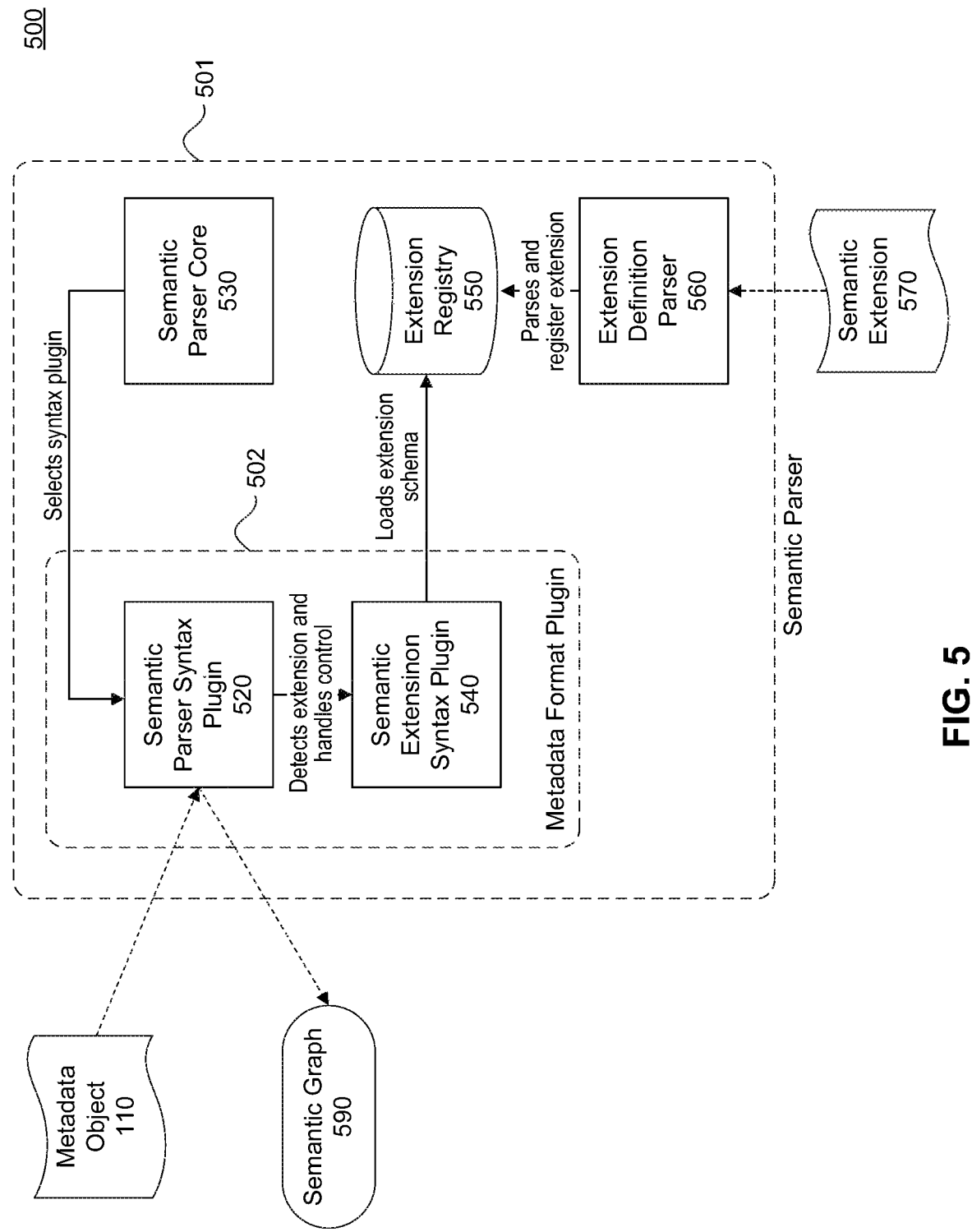
FIG. 5 illustrates a functional block diagram of an exemplary semantic parser system capable of parsing metadata extensions according to embodiments of the present disclosure.

FIG. 5 illustrates a functional block diagram of an exemplary semantic parser system 500 capable of parsing metadata extensions according to embodiments of the present disclosure. As shown in FIG. 5, the semantic parser system receives a metadata object 110 in a given format and outputs the semantic graph 590 that includes the extended graph showing the extension data.

To achieve this, a semantic parser 501 is provided. The semantic parser includes a semantic parser core 530, an extension registry 550, an extension definition parser 560, and a metadata format plugin 502. In an embodiment, the metadata object is received by the metadata format plugin 502. When received, the semantic parser core 530 selects an appropriate semantic parser syntax plugin 520 for use by the metadata format plugin 502. Specifically, as discussed above, in embodiments, the semantic parsing plugin is a module of the semantic parsing infrastructure that is capable of working with one specific metadata format (and its associated format extension syntax) and generating a semantic graph as the output. Thus, it is necessary to select the appropriate plugin for the received metadata object. In embodiments, this will be the plugin corresponding to the metadata object format. In embodiments, there may be several different semantic parser syntax plugins available at the metadata format plugin 502 corresponding to different metadata formats.

Once selected, the semantic parser plugin 520 begins analysis of the metadata object 510. In embodiments, during the analysis the metadata parser plugin 520 detects extensions present in the metadata object 510. In response, the semantic parser syntax plugin 520 initiates the semantic extension syntax parser 540.

In advance of processing, a semantic extension definition 570 is provided to the semantic parser. An extension definition parser 560 accepts an abstract description of the schema of a generic extension and associated semantics. The extension definition parser 560 then parses the extension and generates an intermediate representation as a semantic graph that plugins for different metadata formats will be able to use to map their concrete format syntax to the common schema and semantics.

The extension definition parser 560 stores this intermediate representation in the extensions registry 550 accessible by the semantic parsing infrastructure available for the different semantic parsing modules to search for potential extensions to parse during the parsing process. The extensions registry 550 may be any digital storage component capable of storing the extension representation, including but not limited to one or more databases and/or memories. In an embodiment, the extension registry 550 is a lookup table where parsing modules can do a textual search by the label of a property in the target syntax and semantics of the node being parsed in order to find a registered schema to direct the parsing process of the underlying concrete AST.

To provide an example, an extension schema may be parsed and stored in the extension registry 550 as follows:

| Extension Label | Semantic Target |
|---|---|
| ap-business-term | shapes.Shape |
| ap-business-context | apiContract.WebAPI |

In this example, any semantic parsing plugin that finds a concrete extension label syntactically matching the label 'ap-business-term' in the context of parsing a node that will be mapped to a 'shapes.Shape' node in the output semantic graph can find the relevant schema and semantic information to parse the underlying AST according to the registered extension and generate the appropriate output semantic graph. Likewise, any semantic parsing plugin that finds a concrete extension label syntactically matching the label 'ap-business-context' in the context of parsing a node that will be mapped to a 'apiContract.WebAPI' node in the output semantic graph can find the relevant schema and semantic information to parse the underlying AST according to the registered extension and generate the appropriate output semantic graph.

Therefore, returning to FIG. 5, the semantic extension syntax parser loads extension schema based on a lookup from the extensions registry 550. Using this information, the semantic extension syntax parser 540 generates the extension graph for the metadata format in the manner previously described. Likewise, the semantic parser syntax plugin 520 generates the primary semantic graph. Once both graphs have been prepared, they are combined into an output graph.

The above describes the core parsing logic which satisfies the generation of the enriched semantic graph as the output of the semantic parsing process. However, information captured in the semantic extension can also be used to satisfy other use cases when working directly with the concrete extension syntax in the different formats. For example, in embodiments, a language server capable of understanding the schema associated with a semantic extension can provide rich editing capabilities that can be combined with the standard understanding of the API specification's own syntax. In embodiments, this functionality may support suggestions of the list of extensions valid relative to the cursor position, autocompletion of the structure of the extension being edited, and validation of the syntax of the extension being edited in the same format as the regular validation errors for the API specification being edited.

If the specification format requires the extension to be declared (such as in the GraphQL standard), the language server introduces the declaration of the extension in the scope of the current document being edited when the extension is applied for the first time. In embodiments, translation support of the semantic extension to different syntaxes provided as part of the translation capabilities of the semantic parser can be used to generate the syntax of the extension in the target language.

Figure 6:
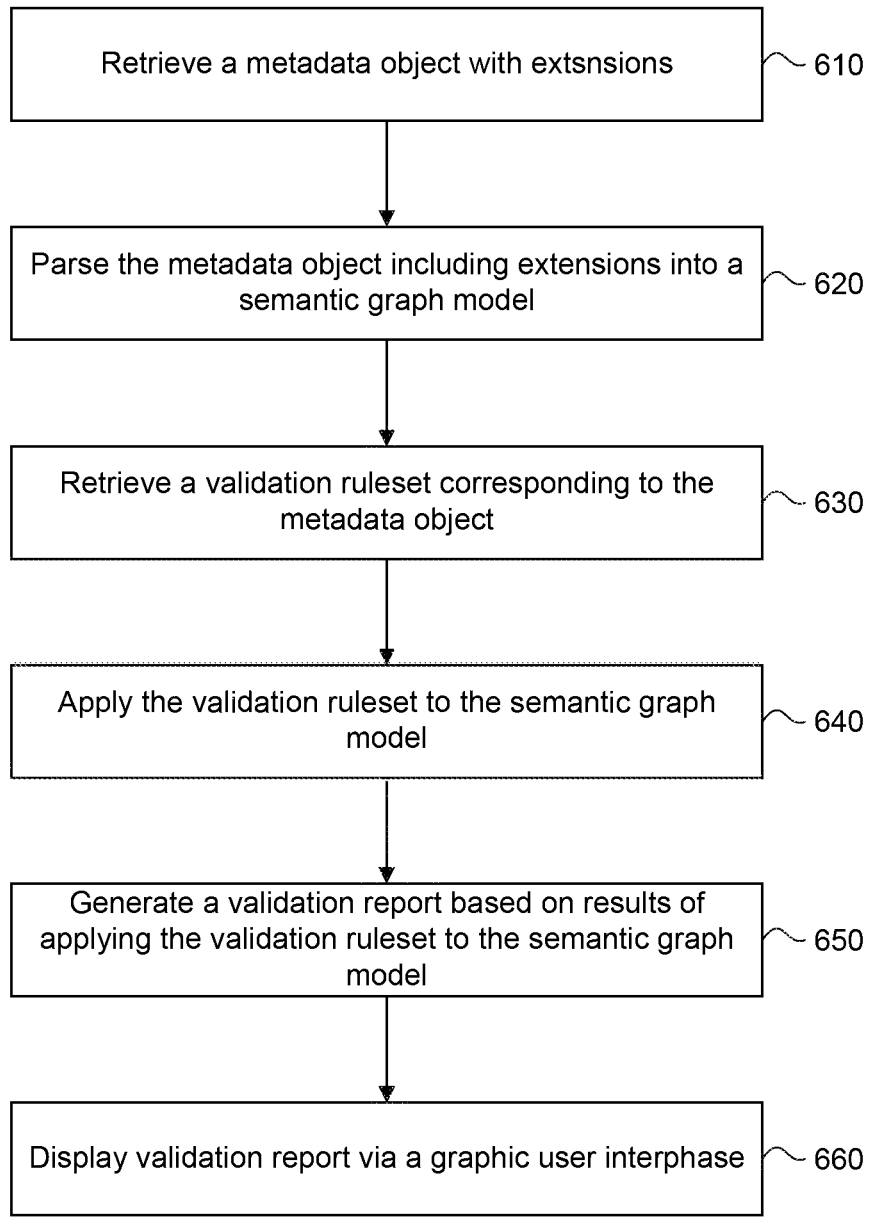
FIG. 6 illustrates a flowchart diagram of an exemplary method for validating metadata using a semantic schema validation, in accordance with embodiments of the present disclosure.

FIG. 6 is a flowchart diagram of an exemplary method 600 for validating metadata using a semantic schema validation, in accordance with embodiments of the present disclosure. Method 600 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in method 600 may not need to be performed in the exact order shown, as will be understood by a person of ordinary skill in the art. Accordingly, the scope of the invention should not be considered limited to the specific arrangement of steps shown in FIG. 6. In some instances, method 600 shall be described with reference to previous figures. However, method 600 is not limited to those example embodiments.

In step 610, one or more metadata objects 110 describing a resource may be retrieved from a database. The one or more metadata objects may have different metadata formats. In embodiments, the metadata formats may include metadata extensions. The one or more metadata objects may then be input into semantic parser 120.

In step 620, semantic parser 120 may parse the one or more metadata objects into one or more semantic graphs 130. Sematic graphs 130 may be data formats in which information is stored as linked nodes holding properties. Every node of sematic graph 130 may have a valid global identifier. Additionally, every node, link and property may have a well-defined meaning through a set of globally valid labels attached to them. The resulting labelled semantic graph 130 may be used as input for a formal reasoning engine transforming it into an equivalent set of logical assertions. In embodiments where the metadata object includes metadata extensions, the semantic parser includes a parsing plugin that retrieves the appropriate semantic extension definition and likewise parses the extension data from the metadata object. As with the basic format, the graph will also include nodes associated with the metadata extension data.

In some embodiments, semantic parser 120 may generate global identifiers for each node in the one or more semantic graphs 130. Additionally, semantic parser 120 may generate one or more source maps 112. Source maps 112 may contain information relating each node, link, and property of semantic graphs 130 to the specific syntactical location (line, column) in the source metadata object from which the information was parsed. Additionally, source map 112 may be stored in semantic graphs 130.

In step 630, a validation ruleset 140 corresponding to the resource being validated may be retrieved from the database and input into semantic parser 122. Semantic parser 122 may accept validation ruleset 140 as an input and output semantic constraints 150. Semantic parser 122 may also generate source map 114. Source map 114 may contain information relating each semantic constraint node to the specific syntactical location (line, column) in the source validation ruleset from which the constraints were parsed. Semantic constraints 150 may comprise a set of sematic constraints as defined by validation rules in validation ruleset 140. Additionally, semantic constraints 150 may map to semantic graphs 130 over which the constraints will be applied.

In step 640, validation engine 220 may apply the semantic constraints 150 defined by validation ruleset 140 over semantic graphs 130. Validation engine 220 may perform the validation by applying semantic constraints 150 to semantic metadata 130. Validation engine 220 may be a component of semantic validator 160.

In order to facilitate this validation, semantic validator 160 may first link the one or more input semantic graphs 130 in a semantic graph linking process. Semantic validator 160 may combine input semantic graphs 130 into a single, unified semantic graph by merging nodes with the same global identifier. Semantic validator 160 may then enrich the unified semantic graph by applying a set of logical rules that add new labels into semantic graph nodes, properties, and links. Multiple logical formalisms can be used to define the rules enriching the semantic graph consumed as a set of logical assertions: rules, ontologies, query languages. For example, a rule asserting that every node returned by an "api: Operation" node may also be classified as an "api: Message" node may be applied to the unified semantic graph. These types of semantic inferences allow for unifying semantic differences that may still exist due to initial input metadata objects 110 having different metadata formats. This process also allows for mapping related concepts to a common ontology.

In some embodiments, sematic validator 160 may use a validation engine to interpret the validation ruleset into a set of logical assertions that makes it possible to check the constraints over the semantic graph 130. This may be achieved through multiple mechanisms and the format of the resulting structural checks may depend on the validation library used (e.g., OPA). Additionally, the structural checks may be defined in terms of the semantic labels associated with the nodes, properties, and links of the semantic graph which server as rule targets.

Once the validation ruleset has been interpreted into structural checks and sematic graphs 130 have been unified into a single semantic graph and subsequently enriched, validation engine 220 may then apply the structural checks over the unified semantic graph. During this semantic validation, validation engine 220 may report non-conformant nodes in the graph for each of the semantic constraints being validation.

In step 650, validation engine 220 may generate a validation report 170 comprising violations of the validation rules. Validation report 170 may have a semantic graph format that can be linked, stored and queried together with the source semantic graph being validated. However, validation report 170 may not be of an ideal format for human consumption. As such, validation report may be converted into textual validation report 190 using metadata generator 180. For each violation/non-conforming node reported, textual validation report 190 may provide the severity of the violation, the validation error message, the identifier of the rule, the unique global identifier of the node in the semantic graph, and syntax information of the location of the failing node in the source metadata object. Textual validation 190 may additionally provide, for each violation, an execution trace containing the evaluation steps followed by the validator to check the failed semantic constraint over the input semantic graph. This may be useful for debugging the violations.

In step 660, textual validation report 190 may be transmitted to a client device and displayed via a user interface (UI) to a user with the appropriate credentials. Additionally, or alternatively, violations reported in textual validation report 190 may cause a notification to be generated and pushed to client devices for one or more designated users. Designated users may be users with admin access and/or users that have been assigned ownership of the resource for which the validation was performed within the IT system.

Figure 7:
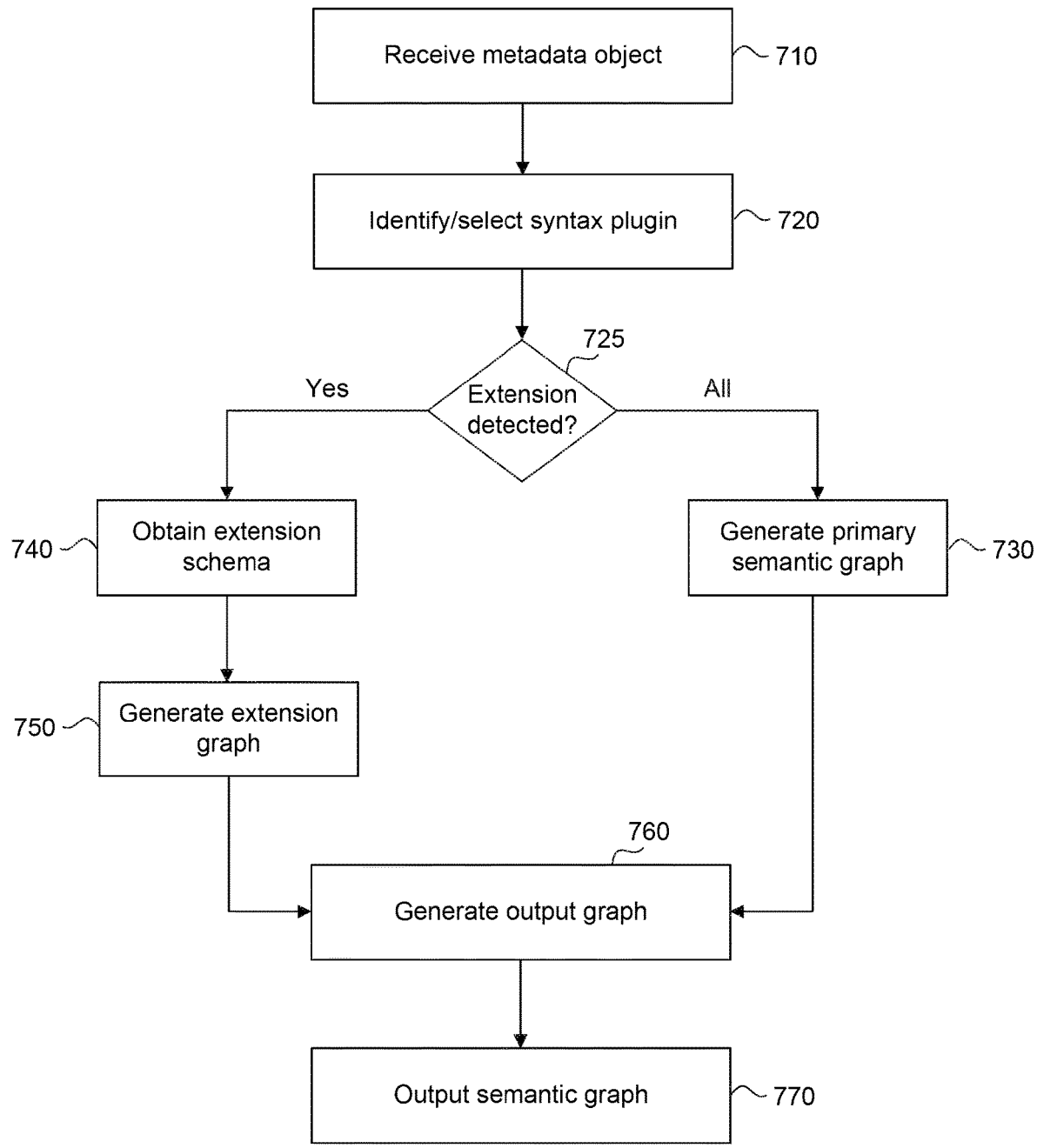
FIG. 7 illustrates a flowchart diagram of an exemplary method for graphing metadata objects having metadata extension data, in accordance with embodiments of the present disclosure.

FIG. 7 illustrates a flowchart diagram of an exemplary method 700 for graphing metadata objects having metadata extension data, in accordance with embodiments of the present disclosure. Method 700 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in method 700 may not need to be performed in the exact order shown, as will be understood by a person of ordinary skill in the art. Accordingly, the scope of the invention should not be considered limited to the specific arrangement of steps shown in FIG. 7. In some instances, method 700 shall be described with reference to previous figures. However, method 700 is not limited to those example embodiments.

As shown in FIG. 7, the method begins by receiving a metadata object in step 710. In an embodiment, the metadata object conforms to a metadata format associated with one or a plurality of standard formats, such as OAS, API specs, or GraphQL. In an embodiment, the metadata object is received by a metadata format plugin 502.

In step 720, the metadata object is analyzed to identify and/or select an appropriate syntax plugin. Specifically, the metadata format plugin 502 may include several different parsers corresponding to the different available metadata formats. Therefore, a semantic parser core 530 determines which of the available plugins is applicable to the received metadata object.

In step 725, a determination is made, using the selected plugin, whether the received metadata object includes one or more extensions. If the metadata object includes extensions, then the method additionally performs steps 740 and 750. In step 740, the method obtains an extension schema associated with the metadata format. In an embodiment, the extension schema is stored in an extension registry, and is loaded by a semantic extension syntax parser 540. Using the retrieved extension schema, the metadata object extension data is parsed in step 750 in order to generate an extension graph 750.

Simultaneously, regardless of whether the metadata object includes metadata extensions, the metadata object is also parsed in step 730 to generate a primary semantic graph 730. In an embodiment, the selected semantic parser syntax plugin 520 parses the metadata object in step 730. This primary graph will be based on the format-consistent data of the metadata object (e.g., it excludes the metadata extensions).

In step 760, a output graph is generated that combines the parsed metadata extensions and the parsed non-extension metadata. In other words, the output graph is a full graph of the metadata object that includes all nodes, including those relating to the metadata extensions. This output graph is then output in step 770. In embodiments, the output is provided to the user as a visual representation of the metadata object. In other embodiments, the graph is output to another computer system for further analysis, such as for detecting errors, consistency, etc.

Figure 8:
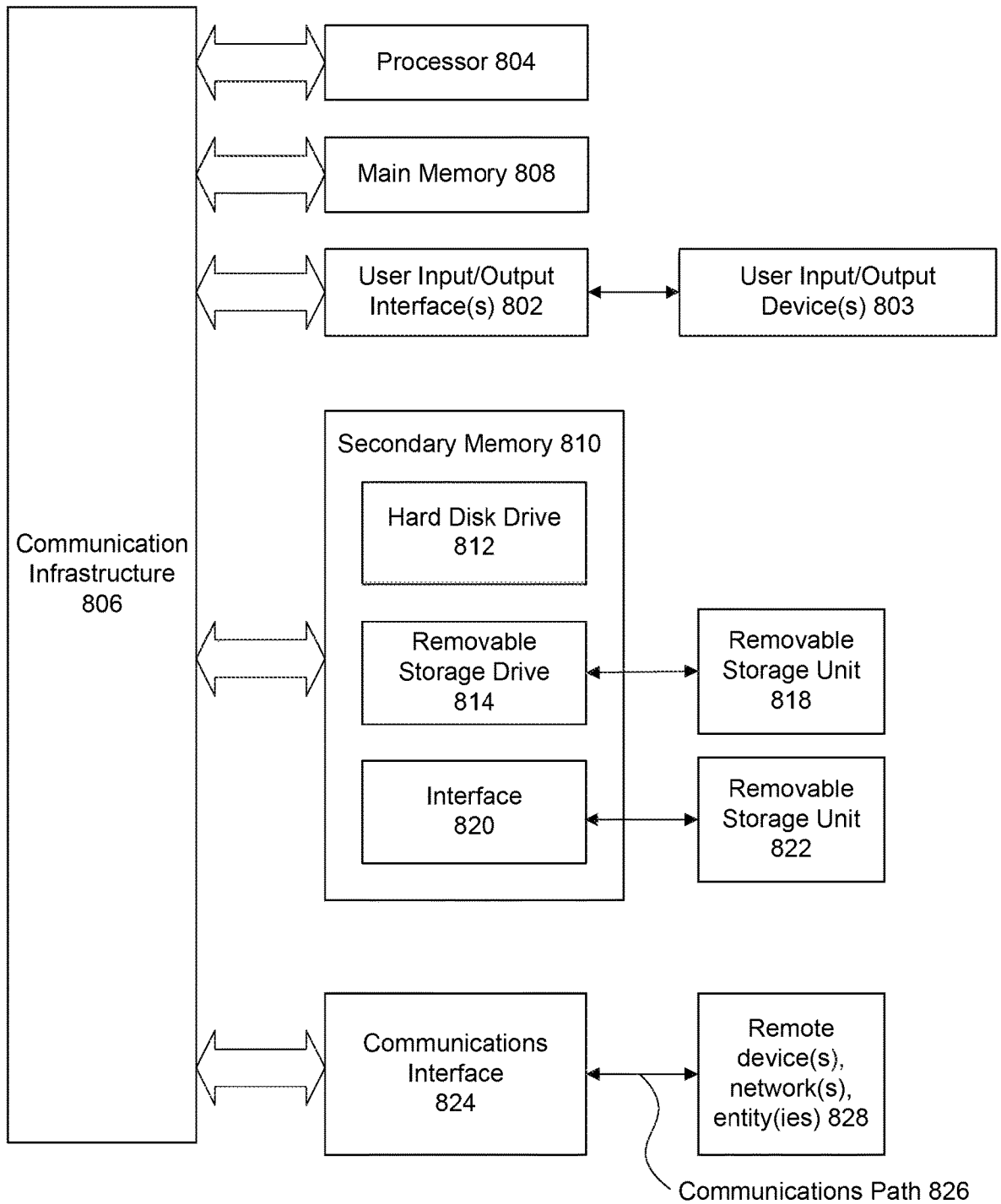
FIG. 8 illustrates an example computer system useful for implementing various embodiments.

Various embodiments can be implemented, for example, using one or more well-known computer systems, such as computer system 800 shown in FIG. 8. One or more computer systems 800 can be used, for example, to implement any of the embodiments discussed herein, as well as combinations and sub-combinations thereof.

Computer system 800 can include one or more processors (also called central processing units, or CPUs), such as a processor 804. Processor 804 can be connected to a communication infrastructure or bus 806.

Computer system 800 can also include customer input/output device(s) 803, such as monitors, keyboards, pointing devices, etc., which can communicate with communication infrastructure 806 through customer input/output interface(s) 802.

One or more of processors 804 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 can also include a main or primary memory 808, such as random-access memory (RAM). Main memory 808 can include one or more levels of cache. Main memory 808 can have stored therein control logic (i.e., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 can include a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 can read from and/or write to removable storage unit 818.

Secondary memory 810 can include other means, devices, components, instrumentalities or other approaches for allowing computer programs and/or other instructions and/or data to be accessed by computer system 800. Such means, devices, components, instrumentalities or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 can enable computer system 800 to communicate and interact with any combination of external devices, external networks, external entities, etc. (individually and collectively referenced by reference number 828). For example, communication interface 824 can allow computer system 800 to communicate with external or remote devices 828 over communications path 826, which can be wired and/or wireless (or a combination thereof), and which can include any combination of LANs, WANs, the Internet, etc. Control logic and/or data can be transmitted to and from computer system 800 via communication path 826.

Computer system 800 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A metadata object graphing system, comprising:
   a memory configured to store an extension definition for a metadata format; and
   one or more processors configured to perform operations stored in the memory, the operations comprising:
      receiving a metadata object;
      selecting a semantic parser syntax plugin corresponding to the metadata format of the metadata object;
      identifying a metadata extension in the metadata object;
      retrieving the extension definition corresponding to the metadata format from the memory; and
      parsing, by the selected semantic parser syntax plugin, the received metadata object, including the metadata extension, based on the extension definition.

2. The system of claim 1, wherein the extension definition defines a schema and associated semantics in an abstract syntax that can be mapped to a format extension syntax of the metadata format.

3. The system of claim 1, wherein the semantic parser syntax plugin parses the received metadata object without the metadata extension.

4. The system of claim 3, wherein the operations further comprise separately parsing the metadata extension.

5. The system of claim 4, wherein the operations further comprise generating a combined graph from the parsed metadata object and the parsed metadata extension that includes the parsed format data and the parsed extension data.

6. The system of claim 1, wherein the operations further comprise generating an output graph that includes a representation of the metadata extension.

7. The system of claim 1, wherein the memory is configured to store a plurality of different extension definitions corresponding to a plurality of different metadata formats.

8. A method for graphing a metadata object, comprising:
   storing an extension definition for a metadata format;
   receiving a metadata object;
   selecting a semantic parser syntax plugin corresponding to the metadata format of the metadata object;
   identifying a metadata extension in the metadata object;
   retrieving the stored extension definition corresponding to the metadata format; and
   parsing, by the selected semantic parser syntax plugin, the received metadata object, including the metadata extension, based on the extension definition.

9. The method of claim 8, wherein the extension definition defines a schema and associated semantics in an abstract syntax that can be mapped to a format extension syntax of the metadata format.

10. The method of claim 8, further comprising parsing the received metadata object without the metadata extension.

11. The method of claim 10, further comprising separately parsing the metadata extension.

12. The method of claim 11, further comprising generating a combined graph from the parsed metadata object and the parsed metadata extension that includes the parsed format data and the parsed extension data.

13. The method of claim 1, further comprising generating an output graph that includes a representation of the metadata extension.

14. The method of claim 1, further comprising storing a plurality of different extension definitions corresponding to a plurality of different metadata formats.

15. A metadata object graphing system, comprising:
a memory configured to store a plurality of extension definitions that each correspond to a different metadata format;
one or more processors configured to perform operations stored in the memory, the operations comprising:
  receiving a metadata object that includes a first portion corresponding to a standard metadata format and a second portion including a metadata extension associated with the standard metadata format;
  selecting a first parser for processing the first portion of the metadata object;
  configuring a second parser for processing the second portion of the metadata object, the second parser corresponding to the metadata extension;
  parsing the first portion and the second portion of the metadata object by the first parser and second parser, respectively; and
  generating an output graph based on the parsing.

16. The system of claim 15, wherein the output graph includes a plurality of linked nodes, each node including a link or property of the metadata object.

17. The system of claim 16, wherein the output graph includes a node corresponding to an element of the metadata extension.

18. The system of claim 15, wherein the first portion and the second portion are separately parsed.

19. The system of claim 18, wherein the operations further comprise combining the parsed first portion and the parsed second portion.

20. The system of claim 15, wherein the operations further include analyzing the received metadata object to identify the metadata format of the metadata object.

* * * * *